United States Patent [19]
Jaimes

[11] Patent Number: 5,911,792
[45] Date of Patent: Jun. 15, 1999

[54] BICYCLE CRANK SYSTEM

[76] Inventor: Jairo Jaimes, 81-12 Roosevelt Ave., Suite 303, Jackson Heights, N.Y. 11372

[21] Appl. No.: 08/909,797

[22] Filed: Aug. 12, 1997

[51] Int. Cl.$^6$ .................................................... B62M 3/00
[52] U.S. Cl. ........................................ 74/594.1; 74/594.2
[58] Field of Search ............................. 74/594.1, 594.2, 74/594.3, 594.7; 384/545, 458

[56] References Cited

U.S. PATENT DOCUMENTS

| | | | |
|---|---|---|---|
| D. 265,812 | 8/1982 | Kastan ................................... | D12/123 |
| D. 299,221 | 1/1989 | Borromeo ............................... | D12/123 |
| D. 319,808 | 9/1991 | Cook ..................................... | D12/123 |
| 4,706,516 | 11/1987 | Xi ......................................... | 74/594.1 |
| 4,811,626 | 3/1989 | Bezin ..................................... | 74/594.1 |
| 5,197,353 | 3/1993 | Trenerry et al. ........................ | 74/594.1 |
| 5,257,562 | 11/1993 | Nagano .................................. | 74/594.2 |

FOREIGN PATENT DOCUMENTS

| | | | |
|---|---|---|---|
| 0143-140 | of 0000 | European Pat. Off. . | |
| 774605 | 12/1934 | France ................................... | 74/594.1 |
| 1020997 | 11/1952 | France . | |
| 413208 | 4/1946 | Italy ....................................... | 74/594.1 |
| 12588 | 4/1900 | United Kingdom ................... | 74/594.1 |

*Primary Examiner*—John A. Jeffrey
*Assistant Examiner*—Mary Ann Battista

[57] ABSTRACT

This system is designed to eliminate the dead spot and enable the user to gain an increased stroke power, thus also increasing the speed of the bicycle. It is composed of a pair of crank arms of an obtuse configuration. Each crank presents an orifice, located at the middle part of the crank's vertex, that when connecting to the spindle allows them to integrate from left to right. These orifices function is to work as attachment and leaning point for the crank arms. Each crank arm opposite to the pedal receptor presents another orifice that will integrate through another element to the spindle, which will exercise the effect of traction, thus the function of the crank.

6 Claims, 2 Drawing Sheets

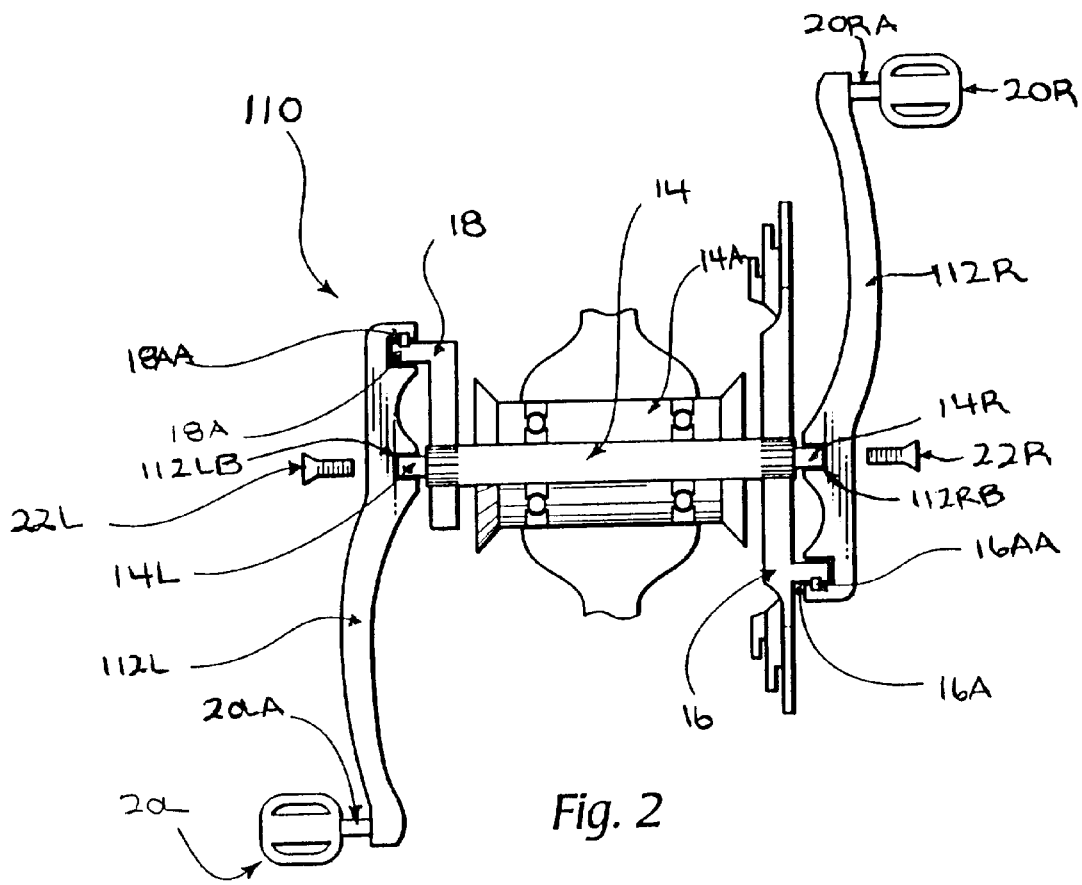
Fig. 2
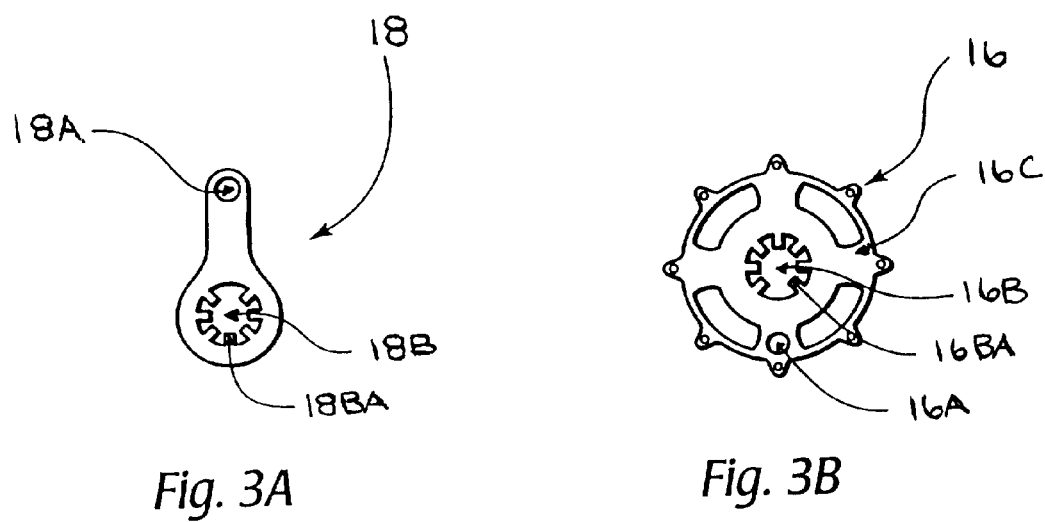
Fig. 3A
Fig. 3B

BICYCLE CRANK SYSTEM

BACKGROUND OF THE INVENTION

1. Field of the Invention

The present invention relates to an improved bicycle crank system. More particularly, the present invention relates to an improved bicycle crank system specifically adapted to enable the user to conserve energy during each stroke due to an increase in stroke power and efficiency.

2. Description of the Prior Art

The opportunity to gain an increase in power in the operation of a simple crank system, such as used in the operation of a bicycle, window handle or related crank system, has always been a paramount interest and concern. As important as the demands for greater speed and higher performance are, there is a reciprocal need to achieve these objectives with the use of less effort and energy. Indeed, as human-powered vehicles such as bicycles evolve to a point where competing cyclists seek every possible advantage over their adversaries, the demand for faster, lighter, more aerodynamic parts and equipment has forced the hand of invention time and again. The most integral feature of a bicycle is the crank system, which generates the forward momentum of a bicycle. The current crank system utilizes two crank arms which operate opposite one another, and rotate around a spindle which is housed within a bottom bracket on the lower portion of the bicycle. This conventional crank system results in a substantial decrease in stroke power when the cranks reach a point of rotation where they are perpendicular to the ground. This loss of power is commonly known as a "dead spot". The loss of stroke power results in a decrease in speed, thereby slowing the momentum of the bicycle. Therefore, what is needed is a new crank system which is designed to eliminate this so called "dead spot", enabling the user to gain increased stroke power thereby improving the speed of the bicycle.

Numerous innovations for an improved bicycle crank system have been provided in the prior art that are described as follows. Even though these innovations may be suitable for the specific individual purposes to which they address, they differ from the present invention as hereinafter contrasted.

U.S. Pat. No. 5,257,562 to Nagano discloses a bicycle crank mechanism for attaching a pedal to a crank arm. This patent enables a back and forth motion of the pedal relative to the pedal shaft. Because typical bicycle pedals are rotatable relative to the pedal shaft only, a back and forth motion of the pedal relative to the pedal shaft is not possible. This patent differs from the improved bicycle crank system because the present patent does not disclose a brace which would angularly attach to either crank, thereby eliminating the dead spot associated with the conventional crank system.

U.S. Pat. No. 5,197,353 to Trenerry et al. reveals a crank and spider assembly for a bicycle. The present patent offers a stronger and lighter weight crank and spider assembly which is also aerodynamic. There are grooves cut into the crank arm which reduce the weight of the cranks. Moreover, the cranks are manufactured from a lightweight aluminum further reducing the cranks weight. The lightweight aluminum also enhances the durability of the cranks. The present patent differs from the improved bicycle crank system because the improved bicycle crank system functions as a method to increase power in the pedal stroke, by employing a brace angularly attached to the crank, which brace is not disclosed in the present patent.

U.S. Pat. No. 319,808 to Cook discloses a bicycle crank with an ornamental design affixed thereto. This patent differs from the improved bicycle crank system because the present patent functions as an aesthetic improvement to the crank, whereas the improved bicycle crank system functions as a method to increase stroke power by eliminating the dead spot.

U.S. Pat. No. 299,221 to Borromeo discloses a pedal crank for a bicycle. This patent differs from the present invention because this patent utilizes a single crank attachment pivotally mounted on one distal end of each crank, which crank attachment is secured to a spindle in the bottom bracket. The improved bicycle crank system utilizes two crank attachments, the first crank attachment being secured to the spindle in the bottom bracket. The second crank attachment, which is embodied in the improved bicycle crank system, is secured to a brace extending from the spindle shaft and is not disclosed in the present patent.

U.S. Pat. No. 265,812 to Kastan discloses a crank arm for a bicycle crank assembly. This patent differs from the present invention because this patent utilizes a single crank attachment pivotally mounted on one distal end of each crank, which crank attachment is secured to a spindle in the bottom bracket. The improved bicycle crank system utilizes two crank attachments, the first crank attachment secures the crank to the spindle in the bottom bracket. The second crank attachment, which is embodied in the improved bicycle crank system, is secured to a brace extending from the bottom bracket and is not disclosed in the present patent.

U.S. Pat. No. 4,811,626 to Bezin discloses a bicycle pedal crank that is divided into individual sections. The middle section of the crank is manufactured from carbon or aramide fibers and either end of the crank is manufactured from a metal or metal alloy. The middle section of the crank functions as a means to reduce the weight of the entire crank while the assemble crank will maintain a level of strength comparable to the one-piece cranks. This patent differs from the present invention because the crank in the improved bicycle crank system is constructed as a single unit and not sectionally. Moreover, the present patent does not disclose a method to increase the stroke power of a crank system.

The French #774,605 patent claims a comprehensively different system than does the present invention. The French #774,605 patent is specifically designed as a device with drive cranks mounted idly on extremities of a drive axle, either directly or through ball bearings, and extended beyond the axle so that one can be linked to the rear control wheel or pinion wheel, and the other to a small arm or connecting rod, with the control wheel and the small arm installed on the drive axle so as to drive it in rotating fashion. While it is applicable for this specific but limited use, the French #774,605 patent as a whole constitutes a wholly different aspect of the complete Present invention.

The patent by French #774,605 differs in that it does not take advantage of the embodiment present in the Present invention. The Present invention discloses an improved bicycle crank system comprised of cranks which are mounted to a spindle shaft, and which are further attached to a brace which functions as a means of eliminating the dead spot associated with the conventional crank system. The braces are angularly attached to the cranks, allowing for a transfer of stroke power from the spindle attachment to the brace attachment when the cranks rotate to 180 degrees and 360 degrees. The French #774,605 patent differs from the present invention because the present invention utilizes a hollow crank arm assembly rather than a solid configuration. This provides for lighter crank that requires less effort on the part of the user to rotate. The present invention is easier for the rider to utilize, thus adding to the user's enjoyment of the bicycle. Moreover, due to its lighter configuration, the improved bicycle crank means of the present invention will be less costly to manufacture, strengthening its appeal to the consumer. As a result, the Present invention provides a much higher degree of overall utility than does the French #774,605 patent, and will appeal to the vast amount of consumers who will want the benefits of a lightweight, durable, and easy to rotate bicycle crank means. The limitations of the French #774,605 patent will decrease the likelihood of widespread public usage for the French #774,605 patent and conversely, increase the likelihood of widespread public usage for the Present invention.

The Kastan patent claims a comprehensively different system than does the current invention. The Kastan patent is specifically designed as a power transmitting device for a bicycle in the form of a crank that is mounted within a hub housing fixedly secured within the frame of a bicycle. A shaft is rotatably secured within the hub housing with a crank arm attached to each end of the shaft through a spline connection. A sprocket wheel is mounted between one of the crank arms and the hub housing. The sprocket wheel is fixedly secured to this crank arm. While it is applicable for this specific but limited use, the patent as a whole constitutes a wholly different aspect of the complete Present invention.

The patent by Kastan is inferior in that it does not take advantage of the embodiment present in the Present invention. The Present invention discloses an improved bicycle crank system comprised of cranks which are rotatably mounted to a spindle shaft, and which are further attached to a brace which functions as a means of eliminating the dead spot associated with the conventional crank system. The braces are angularly attached to the cranks, allowing for a transfer of stroke power from the spindle attachment to the brace attachment when the cranks rotate to 180 degrees and 360 degrees. In addition, an extra weight is attached to one end of the brace, the extra weight eliminates the dead spot of the pedal rotation by enabling the cranks to rotate over the dead spot. This configuration increases the strength of the cranks by and additional impulse to the same through the utilization of the braces and eliminates the dead spot because of the assembly of the extra weight. The Kastan patent differs from the present invention because the present invention includes a brace chain ring base comprised of a brace chain ring base spindle housing through which a spindle shaft is inserted. The brace chain ring base spindle housing of the present invention is rotatably mounted by means of brace chain ring base spindle opening tongue which attaches to the spindle shaft. The brace beam is secured to the crank by a brace beam peg which extends upwardly from a brace beam joint. The brace beam joint peg is inserted into the crank curved arm brace housing. The brace beam is further comprised of a brace beam spindle housing through which the spindle shaft is rotatably inserted, and is further secured onto the spindle shaft by means of brace beam spindle opening tongue. The Kastan invention, in contrast, utilizes only a spline engaging opening formed within the inner end of the crank arm, which engages in a close fitting manner with a plurality of spleens. Further, the Kastan patent does not teach the usage of any mechanism to correspond to the brace beam of the present invention, which is specifically designed to distribute the force exerted upon the crank. This will eliminate the "dead spot" currently experienced by bicyclists, wherein the crank is rigid and difficult to rotate in one isolated point of every rotation.

Numerous innovations for the improved bicycle crank system have been provided in the prior art that are adapted to be used. Even though these innovations may be suitable for the specific individual purposes to which they address, they would not be suitable for the purposes of the present invention as heretofore described.

U.S. Pat. No. 4,706,516 to Xi presents a variable leverage pedal crank for which by special mechanisms moves forward to back with each 360 degree turn. It differs from the present invention because it does not have a fixed crankarm and it does not present any angles.

Great Britain Patent No. 12,588 presents a description to improve to how the cycle pedal pin is secured in the cycle crank. It differs from the present invention because it does not present an angle crankarm.

European Patent No. 143-140-A to Battistutta presents each pedal crank comprised of a series of levers keyed to rotate coaxial on the center transmission axis with the crank lever. It differs from the present invention in that is does not present an angled crankarm, a brace and a brace chainring.

SUMMARY OF THE INVENTION

In a conventional crank system, the left crank is attached at an inner distal end to a left spindle and an outer distal end to a pedal rotatably mounted thereon. A right crank is attached at an inner distal end to a right spindle and an outer distal end to a pedal rotatably mounted thereon. The spindle attachments are the only means by which the crank attaches to the bicycle. Because of this singular means of attachment, the conventional crank system results in a dead spot when the cranks rotate to 180 and 360 degrees. The improved bicycle crank system has a pedal rotatably mounted at an outer distal end of the crank which is attached in an approximate middle section to the spindle and further attached at a downward obtuse angle to a brace post. When a user's pedals are positioned at 180 and 360 degrees and downward pressure is applied thereto, a fulcrum effect occurs wherein the direct pressure is transferred from the spindle (as depicted in regular cranks) to the brace post which is extended at a downward angle beyond the spindle resulting in a power stroke and no "dead spot" as compared to a conventional crank which has a limited power stroke.

Accordingly, it is an object of the present invention to provide an improved bicycle crank system.

More particularly, it is an object of the present invention to provide an improved bicycle crank system which functions a method of enhancing the power of a pedal stroke by eliminating the "dead spot" that is associated with conventional crank systems.

In keeping with these objects, and with others which will become apparent hereinafter, one feature of the present invention resides, briefly stated, in that the improved bicycle crank system allows for an increase in power in the pedal stroke by utilizing a brace beam and a brace chaining base to eliminate the dead spot in the pedal rotation.

When the improved bicycle crank system is designed in accordance with the present invention, it will enable the user to realize an increase in speed as a result of an enhanced power stroke in the pedal rotation.

Another feature of the present invention is its versatile construction, enabling the improved bicycle crank system to be manufactured in a variety lengths in order to satisfy the demands of the individual user.

Still another feature of the present invention is that it may be manufactured from a number of different materials including, but not limited to metal, metal alloy, steel, aluminum, carbon, carbon composite, titanium, beryllium, and magnesium.

Another feature of the present invention is that the cranks may be manufactured in a solid form or a hollow form in order to reduce weight.

Another feature of the present invention is that the cranks may be configured as straight or with various curves, bends and other ornamental configurations.

Another feature of the present invention is that the brace beam may be manufactured with an angular configuration relative to the cranks for increased stroke power, or parallel to the cranks for increased strength and durability.

Still yet another feature of the present invention is the simplicity of design, which would facilitate the manufacture and production of the improved bicycle crank system.

Another feature of the present invention is its light weight, which would result in only an advantage to the bicycle weight.

Another feature of the present invention is the aerodynamic design of the improved bicycle crank system, precluding a marked increase in wind resistance Another feature of the present invention is the compatibility of the improved bicycle crank system, enabling the same to be utilized in conjunction with a variety of existing bicycle componentry systems.

Another feature of the present invention is that the improved bicycle crank system may be utilized on a road bicycle, mountain bicycle, track bicycle, unicycle, tricycle, or related vehicle utilizing at least one wheel and further being propelled by a crank-like system.

Another feature of the present invention is that the improved bicycle crank system is that it may also be compatible with other mechanisms including a window handle, a grinder, or other mechanism that is manipulated with a single, rotatably mounted crank or crank system.

Another feature of the present invention is that the improved bicycle crank system has the possibility to assemble and extra weight attached to an extreme of the brace, one for each brace. The extra weight eliminates the dead spot of the pedal rotation by enabling the cranks to rotate over the dead spot.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

BRIEF LIST OF REFERENCE NUMERALS UTILIZED IN THE DRAWING
COMMON COMPONENTS TO EMBODIMENT
14—spindle (14)
14L—left spindle (14L)
14R—right spindle (14R)
14A—spindle housing (14A)
16—chainring brace (16)
16A—chainring brace post (16A)
16AA—chainring brace post lock (16AA)
16B—chainring brace spindle opening (16B)
16BA—chainring brace spindle opening tongue (16BA)
16C—chainring brace inner disk (16C)
16D—chainring brace outer disk (16D)
18—brace (18)
18A—brace post (18A)
18AA—brace post lock (18AA)
18B—brace spindle opening (18B)
18BA—brace spindle opening tongue (18BA)
20R—right pedal (20R)
20RA—right pedal member (20RA)
20L—left pedal (20L)
20LA—left pedal member (20LA)
22R—right fastener (22R)
22L—left fastener (22L)
FIRST EMBODIMENT
110—first improved bicycle crank system (110)
112L—first left crank (112L)
112LA—first left crank pedal opening (112LA)
112LB—first left crank spindle opening (112LB)
112LC—first left crank brace opening (112LC)
112R—first right crank (112R)
112RA—first right crank pedal opening (112RA)
112RB—first right crank spindle opening (112RB)
112RC—first right crank brace opening (112RC)
C1 to A2 is a conventional power stroke which is approximately One Hundred Forty (140) degrees.
C1 to C2 is an improved power stroke which is approximately One Hundred Eighty (180) degrees.
A1 to B1 is an area in the conventional pedal rotation where there is no power stroke.

BRIEF DESCRIPTION OF THE PREFERRED EMBODIMENT

FIG. 2 is a front view of a first improved bicycle crank system.

FIG. 3A is a front view of a brace.

FIG. 3B is a front view of a chainring brace.

DETAILED DESCRIPTION OF THE PREFERRED EMBODIMENT

Figure 1:
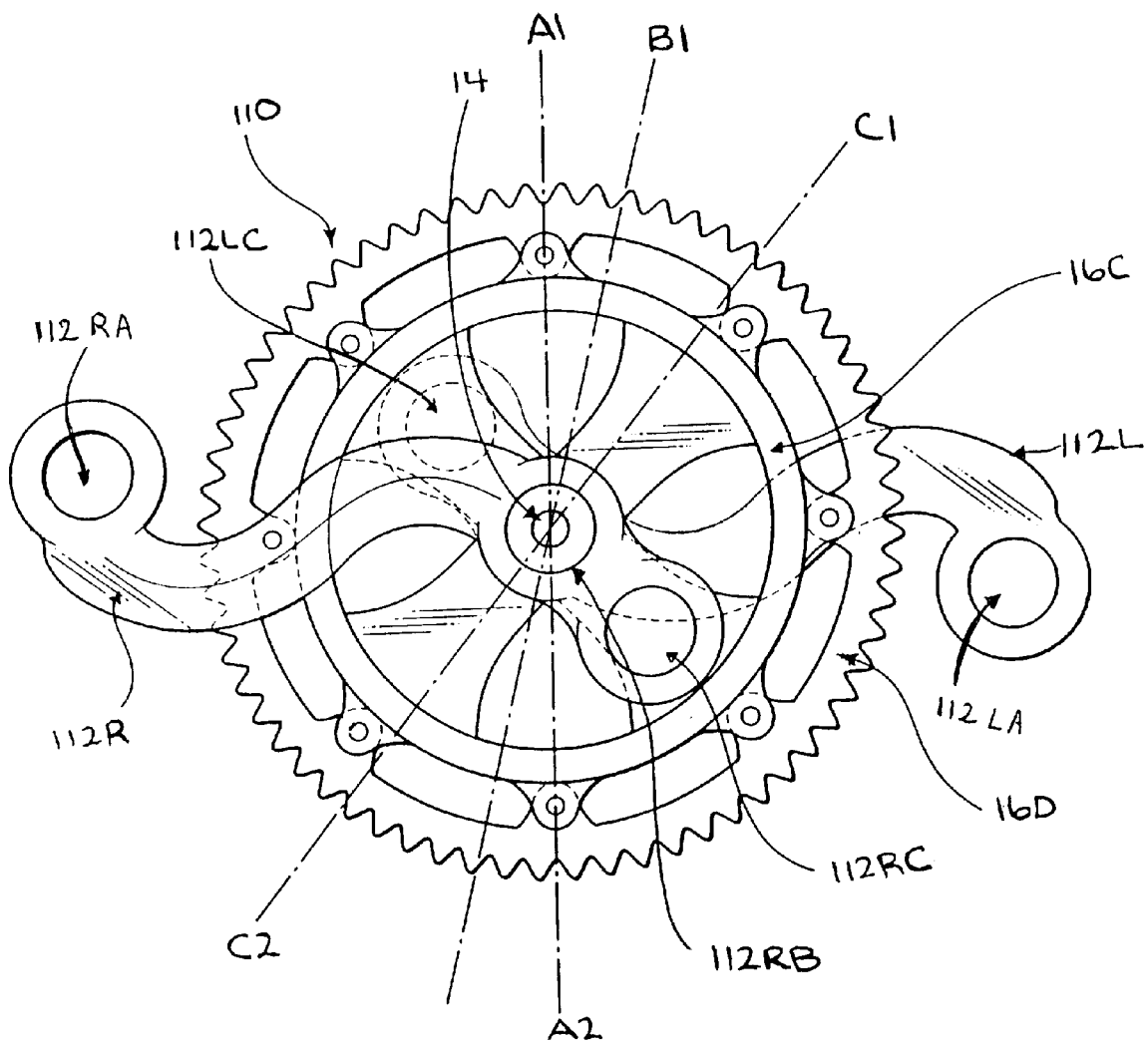
FIG. 1 is a right side view of a first improved bicycle crank system exhibiting the first left crank which is downwardly obtusely angled between the first left crank spindle opening and the first left crank brace opening and the first right crank which is downwardly obtusely angled between the first right crank spindle opening and the first right crank brace opening.

Firstly, referring to FIG. 1 which is a right side view of a first improved bicycle crank system (110) exhibiting the first left crank (112L) which is downwardly obtusely angled between the first left crank spindle opening (112LB) and the first left crank brace opening (112LC) and the first right crank (112R) which is downwardly obtusely angled between the first right crank spindle opening (112RB) and the first right crank brace opening (112RC). Referring to FIG. 2 which is a front view of a first improved bicycle crank system (110). The first improved bicycle crank system (110) comprises a first left crank (112L) which comprises a first left crank pedal opening (112LA) positioned at an outer distal end. The first left crank (112L) further comprises a first left crank brace opening (112LC) positioned at an inner distal end. The first left crank (112L) further comprises a first left crank spindle opening (112LB) positioned between the first left crank pedal opening (112LA) and the first left crank brace opening (112LC). The first left crank (112L) further comprises a downward obtuse angle configuration from the first left crank spindle opening (112LB) to the first left crank brace opening (112LC) in relation to an angle between first left crank pedal opening (112LA) and the first left crank brace opening (112LC).

The first improved bicycle crank system (110) further comprises a first right crank (112R) which comprises a first right crank pedal opening (112RA) positioned at an outer distal end. The first right crank (112R) further comprises a first right crank brace opening (112RC) positioned at an inner distal end. The first right crank (112R) further comprises a first right crank spindle opening (112RB) positioned between the first right crank pedal opening (112RA) and the first right crank brace opening (112RC). The first right crank (112R) further comprises a downward obtuse angle configuration from the first right crank spindle opening (112RB) to the first right crank brace opening (112RC) in relation to an angle between the first right crank pedal opening (112RA) and the first right crank brace opening (112RC).

The first improved bicycle crank system (110) further comprises a spindle (14) rotatably mounted within a spindle housing (14A). The spindle (14) comprises a left spindle (14L) securely positioned in the first left crank spindle opening (112LB) and a right spindle (14R) securely positioned in a first right crank spindle opening (112RB).

The first improved bicycle crank system (110) further comprises a chainring brace (16) which comprises a chainring brace post (16A) extending outwardly from a chainring brace inner disk (16C). The chainring brace post (16A) is securely mounted within the first right crank brace opening (112RC). The chainring brace (16) further comprises a chainring brace outer disk (16D) having a plurality of teeth extending outwardly therefrom. The chainring brace outer disk (16D) is circumferentially positioned around and securely attached to the chainring brace inner disk (16C). The chainring brace (16) is securely attached to the right spindle (14R) which is positioned through a chainring brace spindle opening (16B) centered therein. The chainring brace post (16A) may optionally further comprise a chainring brace post lock (16AA) extending therefrom which securely engages the first right crank (112R).

The first improved bicycle crank system (110) further comprises a brace (18) which comprises a brace post (18A) extending outwardly therefrom. The brace (18) is securely attached to the left spindle (14L) which is positioned through a brace spindle opening (18B). The brace post (18A) is securely mounted within the first left crank brace opening (112LC). The brace post (18A) may optionally further comprise a brace post lock (18AA) extending therefrom which securely engages the first left crank (112L).

The first improved bicycle crank system (110) further comprises a right pedal (20R) is rotatably mounted on a right pedal member (20RA) which is securely attached to the first right crank (112R) within the first right crank pedal opening (112RA). The first improved bicycle crank system (110) further comprises a left pedal (20L) is rotatably mounted on a left pedal peg (20LA) which is securely attached to the first left crank (112L) within the first left crank pedal opening (112LA).

The first improved bicycle crank system (110) is manufactured from a material selected from a group consisting of metal, metal alloy, fiberglass, epoxy, carbon-graphite, wood, wood composite, plastic and plastic composite. The first improved bicycle crank system (110) is preferably manufactured from metal alloy.

Now referring to FIG. 3A which is a front view of a brace (18). At least one brace spindle opening tongue (18BA) may optionally extend inwardly within the brace spindle opening (18B) functioning to engage at least one complimentary groove positioned in the left spindle (14L).

Lastly, referring to FIG. 3B is a front view of a chainring brace (16). At least one chainring brace spindle opening tongue (16BA) may optionally extend inwardly within the chainring brace spindle opening (16B) functioning to engage at least one complimentary groove positioned in the right spindle (14R).

In a conventional crank system, the left crank is attached at an inner distal end to a left spindle and an outer distal end to a pedal rotatably mounted thereon. A right crank is attached at an inner distal end to a right spindle and an outer distal end to a pedal rotatably mounted thereon. The spindle attachments are the only means by which the crank attaches to the bicycle. Because of this singular means of attachment, the conventional crank system results in a dead spot when the cranks rotate to 180 and 360 degrees as exhibited at A1 and A2 (FIG. 1). The improved crank improved bicycle crank system has a pedal rotatably mounted at an outer distal end of the crank which is attached in an approximate middle section to the spindle and further attached at a downward obtuse angle to a brace post. When an user's pedals are positioned at A1 and A2 (FIG. 1) and downward pressure is applied thereto, a fulcrum effect occurs wherein the direct pressure is transferred from the spindle (as depicted in regular cranks) to the brace post which is extended at a downward angle beyond the spindle resulting in a power stroke between position A1–C2 (FIG. 1) and no "dead spot" as compared to a conventional crank which has a limited power stroke between C1–A2.

C1 to A2 is a limited power stroke which is approximately One Hundred Forty (140) degrees and represents the power stroke in the conventional crank system. A1 to A2 is a power stroke which is approximately One Hundred Eighty (180) degrees and represents the power stroke in the improved bicycle crank system. A1 to B1 is an area in the conventional pedal rotation where there is no power stroke, otherwise known as the "dead spot".

While the invention has been illustrated and described as embodied in an improved bicycle crank system, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is desired to be protected by Letters Patent is set forth in the appended claims.

What is claimed is:

1. A first improved bicycle crank system comprising:
   A) a first left crank which comprises a first left crank pedal opening positioned at an outer distal end, the first left crank further comprises a first left crank brace opening positioned at an inner distal end, the first left crank further comprises a first left crank spindle opening positioned between the first left crank pedal opening and the first left crank brace opening, the first left crank further comprises a downward obtuse angle configuration from the first left crank spindle opening to the first left crank brace opening in relation to an angle between the first left crank pedal opening and the first left crank brace opening;
   B) a first right crank which comprises a first right crank pedal opening positioned at an outer distal end, the first right crank further comprises a first right crank brace opening positioned at an inner distal end, the first right crank further comprises a first right crank spindle opening positioned between the first right crank pedal opening and the first right crank brace opening, the first right crank further comprises a downward obtuse angle configuration from the first right crank spindle opening to the first right crank brace opening in relation to an angle between the first right crank pedal opening and the first right crank brace opening;

C) a spindle rotatably mounted within a spindle housing, the spindle comprises a left extreme securely positioned in the first left crank spindle opening and a right extreme securely positioned in the first right crank spindle opening;

D) a chainring brace which comprises a chainring brace post extending outwardly from a chainring brace inner disk, the chainring brace post is securely mounted within the first right crank brace opening, the chainring brace further comprises a chainring brace outer disk having a plurality of teeth extending outwardly therefrom, the chainring brace outer disk is circumferentially positioned around and securely attached to the chainring brace inner disk, the chainring brace is securely attached to the right spindle which is positioned through a chainring brace spindle opening therein centered;

E) a brace which comprises a brace post extending outwardly therefrom, the brace is securely attached to the left spindle which is positioned through a brace spindle opening, the brace post is securely mounted within the first left crank brace opening;

F) a right pedal is rotatably mounted on a right pedal member which is securely attached to the first right crank within the first right crank pedal opening; and G) a left pedal is rotatably mounted on a left pedal member that is securely attached to the first left crank within the first left crank pedal opening.

2. The first improved bicycle crank system as described in claim 1, wherein the chainring brace post further comprises a chainring brace post lock extending therefrom which securely engages the first right crank.

3. The first improved bicycle crank system as described in claim 1, wherein at least one chainring brace spindle opening tongue extends inwardly with the chainring brace spindle opening functioning to engage at least one complimentary groove positioned in the right spindle.

4. The first improved bicycle crank system as described in claim 1, wherein the brace post further comprises a brace post lock extending therefrom which securely engages the first left crank.

5. The first improved bicycle crank system as described in claim 1, wherein at least one brace spindle opening tongue extended inwardly within the brace spindle opening functioning to engage at least one complimentary groove positioned in the left spindle.

6. The first improved bicycle crank system as described in claim 1 is manufactured from a material selected from a group consisting of metal, metal alloy, fiberglass, epoxy, carbon-graphite, wood, wood composite, plastic and plastic composite.

* * * * *